United States Patent
Kikuchi

(10) Patent No.: US 9,094,160 B2
(45) Date of Patent: Jul. 28, 2015

(54) BASE STATION, COMMUNICATION SYSTEM, COMMUNICATION CONTROL METHOD, AND PROGRAM

(75) Inventor: Tooru Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 13/375,722

(22) PCT Filed: Jun. 1, 2010

(86) PCT No.: PCT/JP2010/059265
§ 371 (c)(1),
(2), (4) Date: Dec. 1, 2011

(87) PCT Pub. No.: WO2010/140586
PCT Pub. Date: Dec. 9, 2010

(65) Prior Publication Data
US 2012/0082123 A1    Apr. 5, 2012

(30) Foreign Application Priority Data
Jun. 2, 2009 (JP) ................................. 2009-133224

(51) Int. Cl.
H04W 72/04 (2009.01)
H04L 5/00 (2006.01)
H04W 72/12 (2009.01)

(52) U.S. Cl.
CPC ......... H04L 5/0044 (2013.01); H04W 72/1205 (2013.01)

(58) Field of Classification Search
USPC .................................................. 370/329, 348
See application file for complete search history.

(56) References Cited

U.S. PATENT DOCUMENTS

| 2008/0102846 A1* | 5/2008 | Kim et al. ...................... 455/450 |
| 2010/0103901 A1 | 4/2010 | Miki et al. |
| 2010/0182968 A1* | 7/2010 | Ojala et al. ..................... 370/329 |
| 2011/0117921 A1* | 5/2011 | Gannholm et al. ........... 455/450 |

(Continued)

FOREIGN PATENT DOCUMENTS

| CA | 2674649 A1 | 7/2008 |
| CN | 101247171 A | 8/2008 |
| EP | 1 959 706 A2 | 8/2008 |

(Continued)

OTHER PUBLICATIONS

Office Action dated Jun. 4, 2013 issued by the Japanese Patent Office in counterpart Japanese Patent Application No. 2011-518453.

(Continued)

*Primary Examiner* — Hassan Kizou
*Assistant Examiner* — Hashim Bhatti
(74) *Attorney, Agent, or Firm* — Sughrue Mion, PLLC

(57) ABSTRACT

A base station that executes scheduling for an uplink and scheduling for a downlink per subframe to communicate with mobile stations. The base station comprises: a control information item number estimation unit that estimates the number of control information items usable for the uplink and the number of control information items usable for the downlink per subframe; and a scheduling unit that executes scheduling for the uplink and scheduling for the downlink per subframe by using a number of control information items usable for the uplink and a number of control information items usable for the downlink, the numbers estimated by the control information item number estimation unit.

14 Claims, 4 Drawing Sheets

(56) References Cited

U.S. PATENT DOCUMENTS

2011/0268072 A1* 11/2011 Lee et al. ............... 370/329
2011/0299490 A1* 12/2011 Nordstrom et al. ....... 370/329

FOREIGN PATENT DOCUMENTS

| EP | 2 124 368 A1 | 11/2009 |
| EP | 2 129 139 A1 | 12/2009 |
| JP | 2008-172356 A | 7/2008 |
| JP | 2008-172366 A | 7/2008 |
| JP | 2008-193648 A | 8/2008 |
| JP | 2008-547264 A | 12/2008 |
| WO | 2006/135289 A1 | 12/2006 |
| WO | 2008/100072 A1 | 8/2008 |
| WO | 2008/105316 A1 | 9/2008 |
| WO | WO 2008/127015 A1 | 10/2008 |
| WO | WO2010082877 * 7/2010 ............ H04W 72/12 |

OTHER PUBLICATIONS

Communication dated Jul. 8, 2014, issued by the Intellectual Property Office of P.R. China in counterpart Chinese application No. 201080024420.3.

Search Report dated Apr. 26, 2013 issued by the European Patent Office in counterpart European Patent Application No. 10783369.1.

* cited by examiner

BASE STATION, COMMUNICATION SYSTEM, COMMUNICATION CONTROL METHOD, AND PROGRAM

CROSS REFERENCE TO RELATED APPLICATIONS

This application is a National Stage of International Application No. PCT/JP2010/059265 filed on Jun. 1, 2010, which claims priority from Japanese Patent Application No. 2009-133224, filed on Jun. 2, 2009, the contents of all of which are incorporated herein by reference in their entirety.

TECHNICAL FIELD

The present invention relates to a base station, a communication system, a communication control method, and a program that execute scheduling(s) for an uplink and a downlink per subframe to communicate with mobile stations.

BACKGROUND

LTE (Long Term Evolution) is a communication standard realizing a speed faster than those based on the third-generation mobile phone communication standards. LTE is being formulated by a standardization organization 3GPP. In a communication system adopting LTE (LTE system), most of the data between a base station and a mobile station is sent and received through two shared channels of a physical uplink shared channel (PUSCH) corresponding to an uplink and a physical downlink shared channel (PDSCH) corresponding to a downlink. Based on data transmission and reception through such shared channels, the base station executes scheduling (allocation of any of shared channels to any of mobile stations for communication) for an uplink and for a downlink. Scheduling is executed per subframe independently for an uplink and for a downlink (see Patent Documents 1 and 2, for example). The base station uses a control channel referred to as a physical downlink control channel (PDCCH) to notify each mobile station of scheduling information representing results of each scheduling. The PDCCH includes information elements referred to as downlink control information (DCI) based on scheduling information and is mapped in a subframe in a frame. The base station notifies each mobile station of the PDCCH.

Patent Document 1:
Japanese Patent Kokai Publication No. JP2008-172356A
Patent Document 2:
Japanese Patent Kokai Publication No. JP2008-172366A The entire disclosures of the above Patent Documents are incorporated herein by reference thereto. The following analyses are given by the present invention.

The number of DCI items allocatable to a single subframe is limited and the DCI is shared by an uplink and a downlink. Thus, it is necessary to balance the number of DCI items allocated to each of the uplink and the downlink. However, when scheduling for an uplink and scheduling for a downlink are executed independently at different process timings information cannot be shared, in which the number of DCI items cannot be changed dynamically. As a result, the DCI cannot be allocated efficiently, counted as a problem.

It is a primary object of the present invention to provide a base station, a communication system, and a communication control method that efficiently allocate control information based on scheduling.

According to a first aspect of the present invention, there is provided a base station that executes scheduling for an uplink and scheduling for a downlink per subframe to communicate with mobile stations, the base station comprising: a control information item number estimation unit that estimates the number of control information items usable for the uplink and the number of control information items usable for the downlink per subframe; and a scheduling unit that executes scheduling for the uplink and scheduling for the downlink per subframe by using a number of control information items usable for the uplink and a number of control information items usable for the downlink, the numbers estimated by the control information item number estimation unit.

It is preferred that the base station according to the present invention comprise: a mobile station information management unit managing information about uplink data and downlink data for each of the mobile stations; and a common control information management unit managing common control information. In addition, It is preferred that the control information item number estimation unit by using information from the mobile station information management unit that estimates the number of control information items usable for the uplink and the number of control information items usable for the downlink per subframe and common control information from the common control information management unit.

Based on the base station according to the present invention, It is preferred that the scheduling unit comprise: an uplink scheduling unit that executes scheduling for the uplink per subframe by using the number of control information items usable for the uplink estimated by the control information item number estimation unit and information about uplink data managed by the mobile station information management unit; and a downlink scheduling unit that executes scheduling for the downlink per subframe by using the number of control information items usable for the downlink estimated by the control information number estimation unit and information about downlink data managed by the mobile station information management unit.

Based on the base station according to the present invention, It is preferred that, after receiving scheduling information representing results of scheduling for the downlink from the downlink scheduling unit, the uplink scheduling unit execute scheduling for the uplink.

Based on the base station according to the present invention, It is preferred that, after receiving scheduling information representing results of scheduling for the uplink from the uplink scheduling unit, the downlink scheduling unit execute scheduling for the downlink.

Based on the base station according to the present invention, It is preferred that, when the uplink scheduling unit and the downlink scheduling unit complete respective scheduling processes in a previous subframe, the mobile station information management unit update information about uplink data and downlink data in a next subframe.

Based on the base station according to the present invention, It is preferred that the control information be DCI and that the base station comprise a PDCCH generation unit generating a downlink PDCCH including DCI, based on scheduling information representing results of scheduling from the scheduling unit.

Based on the base station according to the present invention, It is preferred that the control information be CCE and that the base station comprise a PDCCH generation unit generating downlink PDCCH including CCE, based on scheduling information representing results of scheduling from the scheduling unit.

According to a second aspect of the present invention, there is provided a communication system comprising the base station as aforementioned and a mobile station that can communicate with the base station.

It is preferred that the communication system according to the present invention be an LTE system adopting LTE.

According to a third aspect of the present invention, there is provided a communication control method executed in a base station executing scheduling for an uplink and scheduling for a downlink per subframe to communicate with mobile stations. The method comprises: estimating a number of control information items usable for the uplink and a number of control information items usable for the downlink per subframe; and using the estimated number of control information items usable for the uplink and the estimated number of control information items usable for the downlink to execute scheduling for the uplink and scheduling for the downlink per subframe.

Based on the communication control method according to the present invention, It is preferred that, in the estimating the numbers, the number of control information items usable for the uplink and the number of control information items usable for the downlink per subframe be estimated by using information about uplink data and downlink data for each of the mobile stations and common control information.

Based on the communication control method according to the present invention, in the executing scheduling. It is preferred that scheduling for the uplink be executed per subframe by using the estimated number of control information items usable for the uplink and the information about uplink data and that scheduling for the downlink be executed per subframe by using the estimated number of control information items usable for the downlink and the information about downlink data.

Based on the communication control method according to the present invention, It is preferred that, in the executing scheduling, after scheduling information representing results of scheduling for the downlink is received, scheduling for the uplink be executed.

Based on the communication control method according to the present invention, It is preferred that, in the executing scheduling, after scheduling information representing results of scheduling for the uplink is received, scheduling for the downlink be executed.

It is preferred that the communication control method according to the present invention comprise updating information about uplink data and downlink data in a next subframe when a scheduling process for the uplink and a scheduling process for the downlink in a previous subframe are completed.

Based on the communication control method according to the present invention, It is preferred that the control information be DCI and that the method comprise generating a downlink PDCCH including DCI based on scheduling information representing results of the scheduling.

Based on the communication control method according to the present invention, It is preferred that the control information be CCE and that the method comprise generating a downlink PDCCH including CCE based on scheduling information representing results of the scheduling.

According to a fourth aspect of the present invention, there is provided a program causing a base station to execute the communication control method aforementioned. The program may be embodied in a computer readable, non-transient recording medium.

According to the present invention, a base station executes scheduling for an uplink and scheduling for a downlink per subframe, by using an estimated number of control information items usable for the uplink and for the downlink. In this way, even if scheduling for the uplink and scheduling for the downlink are independently executed at different timings, allocation of the control information based on scheduling information can be executed efficiently.

PREFERRED MODES

Figure 1:
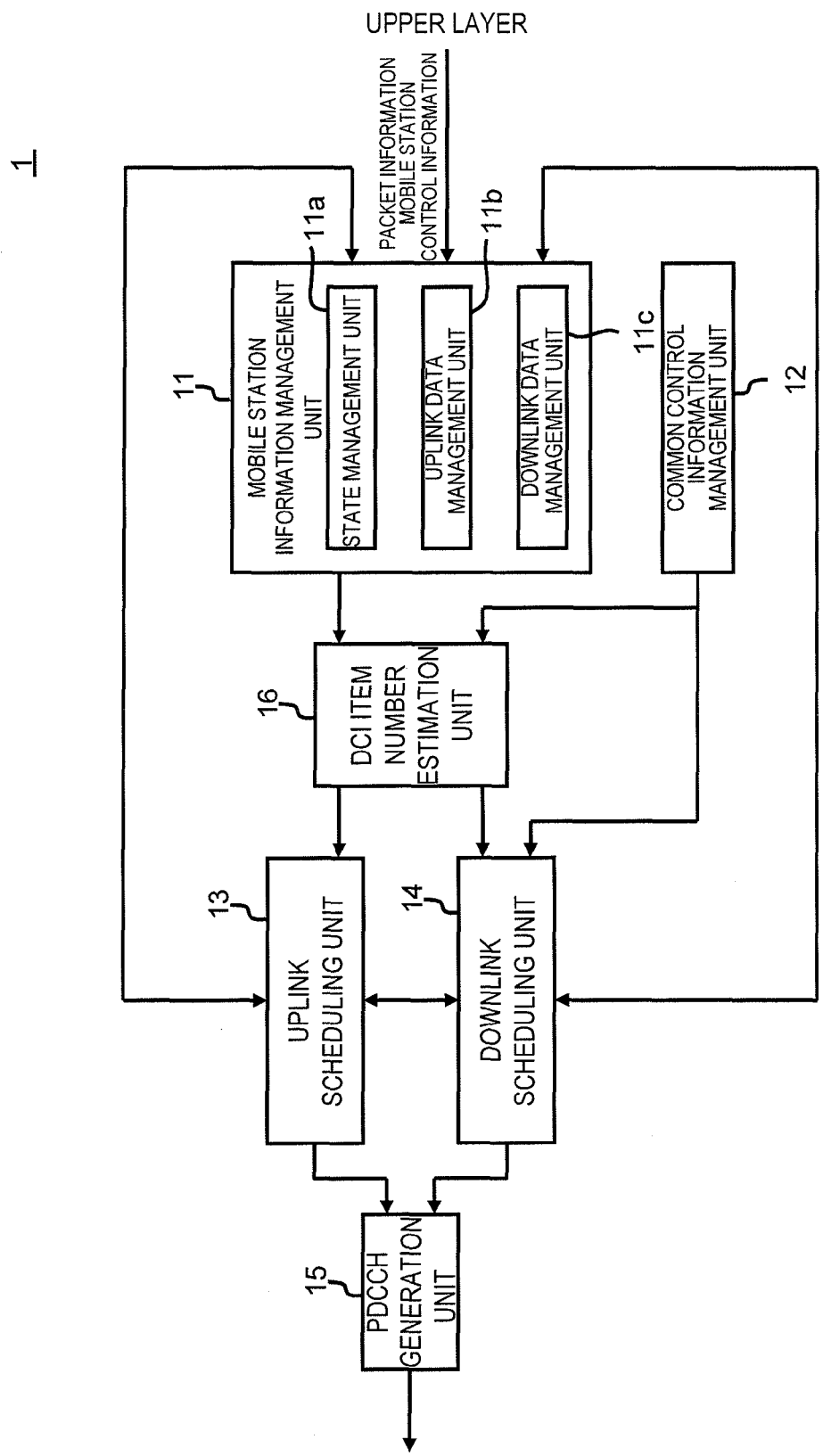
FIG. 1 is a block diagram schematically illustrating a part of a configuration of a base station in a communication system according to example 1 of the present invention.

According to exemplary embodiment 1 of the present invention, there is provided a base station (1 in FIG. 1) that executes scheduling for an uplink and scheduling for a downlink per subframe to communicate with mobile stations. The base station comprises: a control information item number estimation unit (16 in FIG. 1) estimating the number of control information items usable for the uplink and the number of control information items usable for the downlink per subframe; and a scheduling unit (13, 14 in FIG. 1) using the number of control information items usable for the uplink and the number of control information items usable for the downlink, the numbers estimated by the control information item number estimation unit, to execute scheduling for the uplink and scheduling for the downlink per subframe.

According to exemplary embodiment 2 of the present invention, there is provided a communication control method executed in a base station executing scheduling for an uplink and scheduling for a downlink per subframe to communicate with mobile stations. The method comprises steps of: estimating the number of control information items usable for the uplink and the number of control information items usable for the downlink per subframe (DCI item use number estimation process in FIG. 4); and using the estimated number of control information items usable for the uplink and the estimated number of control information items usable for the downlink to execute scheduling for the uplink and scheduling for the downlink per subframe (downlink and uplink scheduling processes in FIG. 4).

The reference characters in the drawings of the present application are used only as examples to facilitate comprehension and are not intended to limit the present invention to the illustrated modes.

Example 1

A communication system according to example 1 of the present invention will be described with reference to the drawings. FIG. 1 is a block diagram schematically illustrating a part of a configuration of a base station in a communication system according to example 1 of the present invention.

In FIG. 1, a base station 1 is used in a communication system (LTE system) adopting Long Term Evolution (LTE) and is configured to enable communication with a plurality of mobile stations (not illustrated). The base station 1 includes a computer function that executes information processing based on a predetermined program. Data between the base station 1 and a mobile station is sent and received through two shared channels of a physical uplink shared channel (PUSCH) corresponding to an uplink and a physical downlink shared channel (PDSCH) corresponding to a downlink.

The base station 1 includes a function of executing a scheduling process for an uplink and a scheduling process for a downlink (allocation of a shared channel to a mobile station for communication). The base station 1 is configured to execute each of the scheduling processes for an uplink and for a downlink independently at different processing timings. The base station 1 includes a mobile station information management unit 11, a common control information management unit 12, an uplink scheduling unit 13, a downlink scheduling unit 14, a PDCCH generation unit 15, and a DCI item number estimation unit 16, which are constituent units to execute the scheduling processes.

The mobile station information management unit 11 manages information about uplink data and downlink data for each mobile station. The mobile station information management unit 11 can receive packet information and mobile station control information (state information set in each mobile station, presence or absence of uplink data about each mobile station and a data size thereof, presence or absence of downlink data about each mobile station and a data size thereof, and the like) from an upper layer. After the uplink scheduling unit 13 and the downlink scheduling unit 14 complete the respective scheduling processes for the previous subframe, the mobile station information management unit 11 updates scheduling-related information for each mobile station in the next subframe. The mobile station information management unit 11 includes a state management unit 11a, an uplink data management unit 11b, and a downlink data management unit 11c.

The state management unit 11a manages state information set in each mobile station by an upper layer, such as DRX (Discontinuous Reception) and Measurement Gap. To determine whether or not scheduling is possible in the next subframe, the state management unit 11a determines whether or not the uplink scheduling unit 13 and the downlink scheduling unit 14 have completed the respective scheduling process in the previous subframe. If the scheduling processes are completed, the state management unit 11a allows the uplink data management unit 11b and the downlink data management unit 11c to execute an update process.

The uplink data management unit 11b manages uplink data information about each mobile station (the number of mobile stations, presence or absence of uplink data, and the data size thereof), the information being sent through a physical uplink control channel (PUCCH). If the state management unit 11a allows an update process, the uplink data management unit 11b updates the uplink data information in the next subframe, based on uplink scheduling information from the uplink scheduling unit 13.

The downlink data management unit 11c manages downlink data information about each mobile station (the number of mobile stations, presence or absence of downlink data, and a data size thereof), the information being sent from an upper layer (the network side). If the state management unit 11a allows an update process, the downlink data management unit 11c updates the downlink data information in the next subframe, based on downlink scheduling information from the downlink scheduling unit 14.

The common control information management unit 12 manages, for example, control information about the downlink control channel (PDCCH) transmission timing and data size, such as notification information sent through the downlink shared channel (PDSCH) notification information.

A DCI item number estimation unit 16 estimates the number of DCI items (estimated DCI item use number) usable for the uplink and for the downlink in the next subframe, based on state information about each mobile station managed by the mobile station information management unit 11 and control channel information managed by the common control information management unit 12. Detail operations of the DCI item number estimation unit 16 will be described later.

When executing an uplink scheduling process, the uplink scheduling unit 13 executes scheduling for the uplink shared channel, based on the mobile station state information and uplink data information managed by the mobile station information management unit 11 and based on the number of DCI items usable estimated by the DCI item number estimation unit 16. Detail operations of the uplink scheduling unit 13 will be described later.

The downlink scheduling unit 14 executes scheduling for the downlink shared channel, based on the mobile station state information and downlink data information managed by the mobile station information management unit 11, the control channel information managed by the common control information management unit 12, and the number of DCI items usable estimated by the DCI item number estimation unit 16. Detail operations of the downlink scheduling unit 14 will be described later.

Based on scheduling information about the shared channels scheduled by the uplink scheduling unit 13 and the downlink scheduling unit 14, the PDCCH generation unit 15 generates DCI (Downlink Control Information) and generates the physical downlink control channel (PDCCH) including the generated DCI. The PDCCH generated by the PDCCH generation unit 15 is mapped in a subframe in a frame. The base station notifies each mobile station of the PDCCH.

Figure 2:
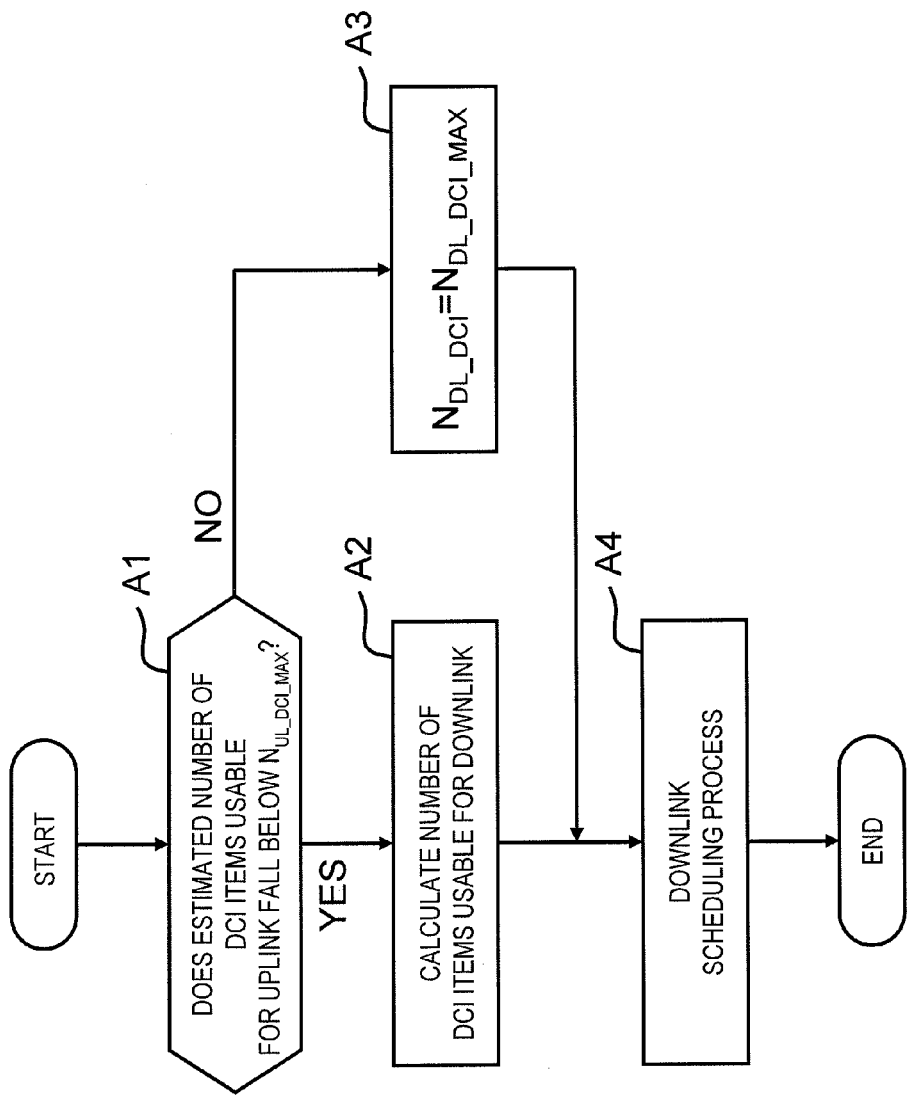
FIG. 2 is a flow chart schematically illustrating a downlink scheduling process executed by the base station in the communication system according to example 1 of the present invention.
Figure 3:
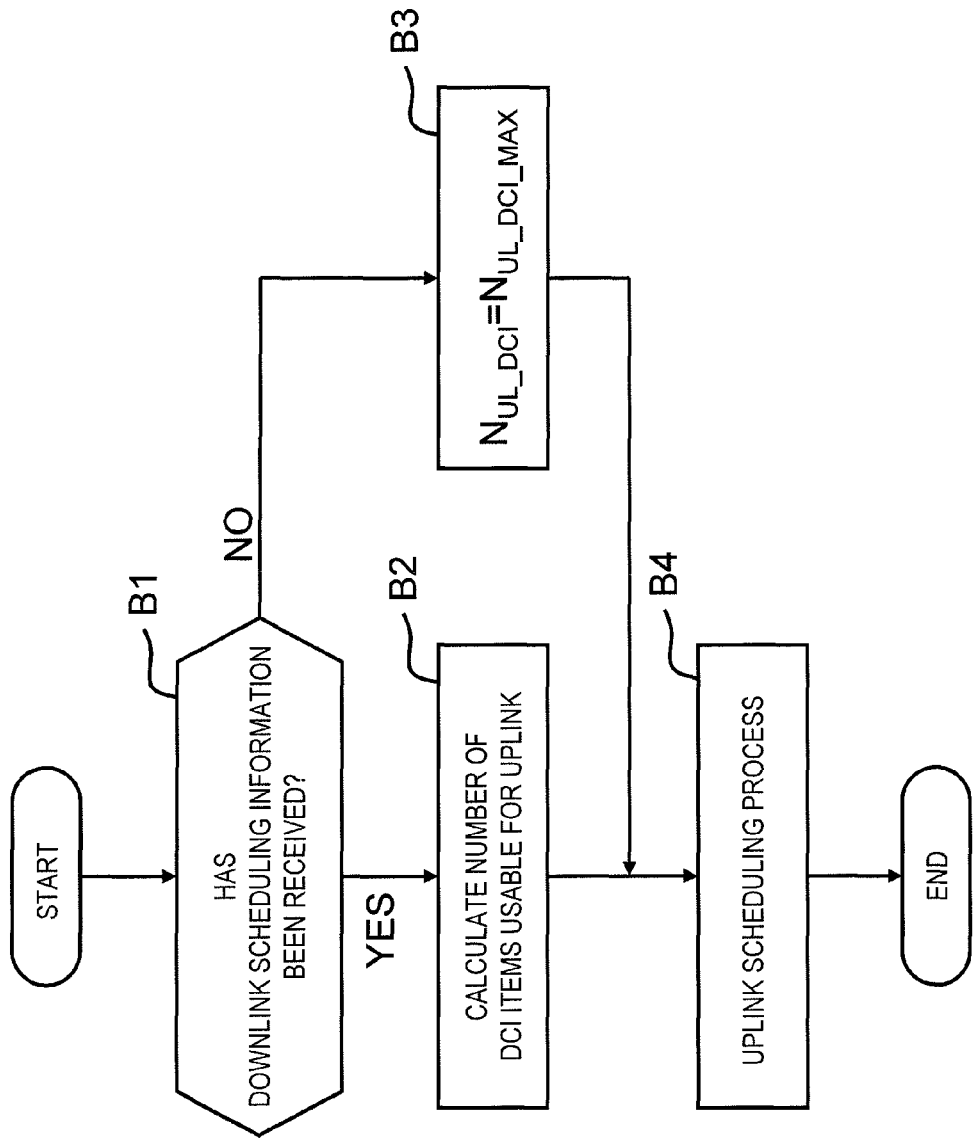
FIG. 3 is a flow chart schematically illustrating an uplink scheduling process executed by the base station in the communication system according to example 1 of the present invention.
Figure 4:
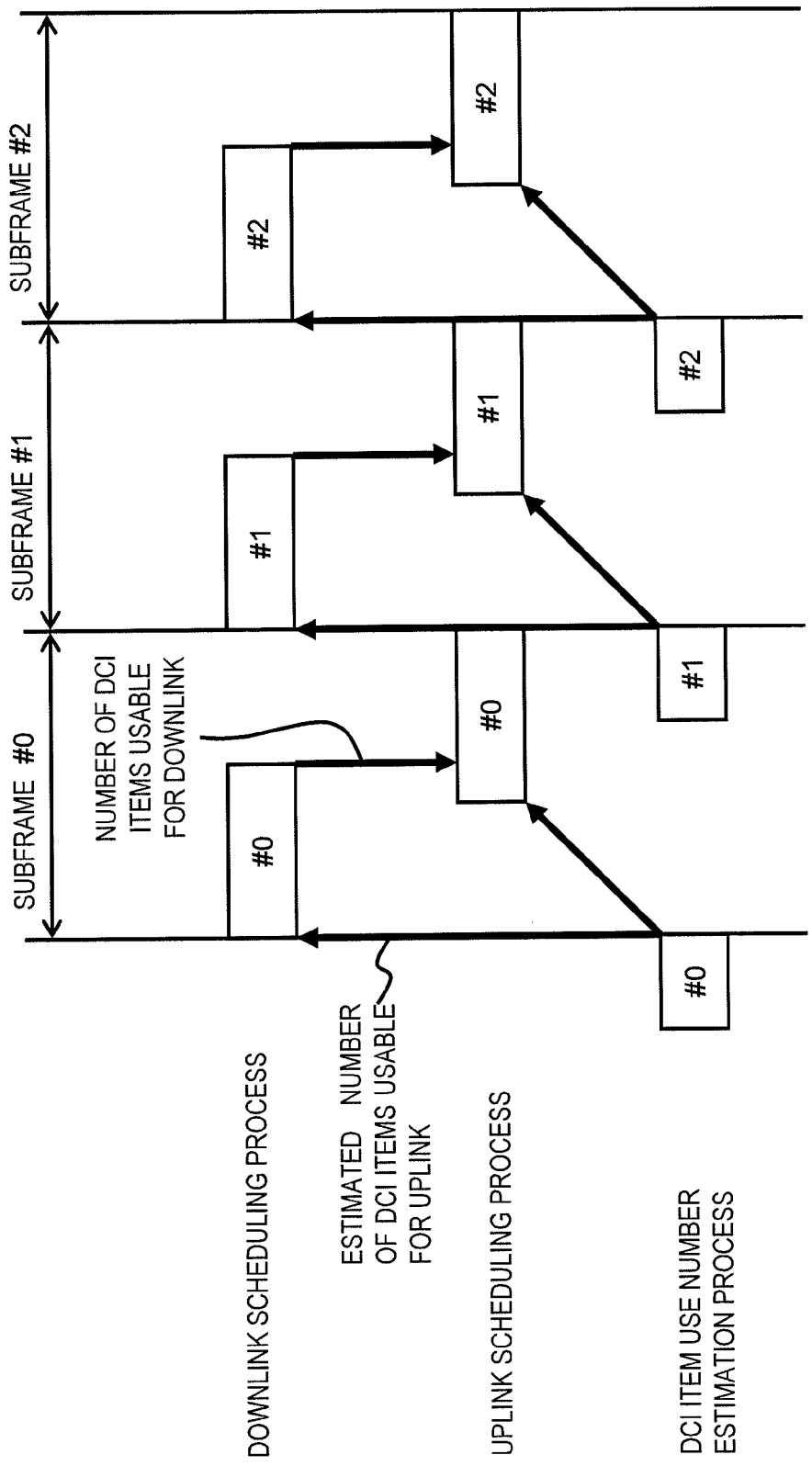
FIG. 4 is a timing diagram schematically illustrating timings of a DCI item use number estimation process, the downlink scheduling process, and the uplink scheduling process executed by the base station in the communication system according to example 1 of the present invention.

Next, an operation of the base station in the communication system according to example 1 of the present invention will be described with reference to drawings. FIG. 2 is a flow chart schematically illustrating a downlink scheduling process executed by the base station in the communication system according to example 1 of the present invention. FIG. 3 is a flow chart schematically illustrating an uplink scheduling process executed by the base station in the communication system according to example 1 of the present invention. FIG. 4 is a timing diagram schematically illustrating timings of a DCI item use number estimation process, the downlink scheduling process, and the uplink scheduling process executed by the base station in the communication system according to example 1 of the present invention. The following description will be made, assuming that a downlink scheduling timing is faster than an uplink scheduling timing. In addition, since scheduling in an LTE system is executed for each subframe, the following description will also be made assuming that scheduling is executed for each subframe.

(DCI Item Use Number Estimation Process)

The DCI item number estimation unit (see 16 in FIG. 1) estimates the number of DCI items usable for an uplink in the next subframe as below.

If it is determined that scheduling is possible in the next subframe based on information from the state management unit 11a, the DCI number estimation unit 16 acquires uplink data information about the next subframe from information from the uplink data management unit 11b. Hereinafter, the number of mobile stations in the acquired uplink data information will be represented by "$N_{UL\_Active}$." Assuming that an estimated number of DCI items usable for an uplink is "$N_{UL\_DCI\_EST}$," a correction coefficient is "$\alpha_{UL\_DCI}$," and the maximum value of the estimated number of DCI items usable is "$N_{UL\_DCI\_MAX}$," "$N_{UL\_DCI\_EST}$" can be obtained as below. The correction coefficient "$\alpha_{UL\_DCI}$" is changeable depending on an algorithm of the scheduling unit 13 or 14.

$$\text{if } ((N_{UL\_Active} * \alpha_{UL\_DCI}) \leq N_{UL\_DCI\_MAX})$$
$$N_{UL\_DCI\_EST} = N_{UL\_Active} * \alpha_{UL\_DCI}$$
$$(\alpha_{UL\_DCI} \leq 1)$$
$$\text{else}$$
$$N_{UL\_DCI\_EST} = N_{UL\_DCI\_MAX}$$

Similarly, the DCI item number estimation unit 16 estimates the number of DCI items usable for a downlink in the next subframe as below.

If it is determined that scheduling is possible in the next subframe based on information from the state management unit 11a, the DCI item number estimation unit 16 acquires downlink data information from information from the downlink data management unit 11c. Hereinafter, the number of mobile stations in the acquired downlink data information will be represented by "$N_{DL\_Active}$." In addition, the DCI item number estimation unit 16 sets a common control information number to "$N_{Common}$," based on information from the common control information management unit 12. Assuming that an estimated number of DCI items usable for a downlink is "$N_{DL\_DCI\_EST}$," a correction coefficient is "$\alpha_{DL\_DCI}$," and the maximum value of the estimated number of DCI items usable is "$N_{DL\_DCI\_MAX}$," "$N_{DL\_DCI\_EST}$" can be obtained as below. As in the case of the uplink, the correction coefficient "$\alpha_{DL\_DCI}$" is changeable depending on an algorithm of the scheduling unit 13 or 14.

$$\text{if } (((N_{DL\_Active} + N_{Common}) * \alpha_{DL\_DCI}) \leq N_{DL\_DCI\_MAX})$$
$$N_{DL\_DCI\_EST} = (N_{DL\_Active} + N_{Common}) * \alpha_{DL\_DCI}$$
$$(\alpha_{DL\_DCI} \leq 1)$$
$$\text{else}$$
$$N_{DL\_DCI\_EST} = N_{DL\_DCI\_MAX}$$

Assuming that the maximum value of the number of DCI items allocated to the PDCCH is "$N_{DCI\_MAX}$," "$N_{UL\_DCI\_MAX}$" and "$N_{DL\_DCI\_MAX}$" are set to satisfy the following relationship.

$$N_{DCI\_MAX} = N_{UL\_DCI\_MAX} + N_{DL\_DCI\_MAX}$$

(Downlink Scheduling Process)

Next, a process flow of the downlink scheduling unit (see 14 in FIG. 1) will be described.

In FIG. 2, first, the downlink scheduling unit 14 determines whether or not the number of DCI items usable "$N_{UL\_DCI\_EST}$" for an uplink estimated by the DCI item number estimation unit 16 falls below the maximum value "$N_{UL\_DCI\_MAX}$" of the uplink DCI item number (step A1). The downlink scheduling unit 14 acquires "$N_{UL\_DCI\_EST}$" and "$N_{UL\_DCI\_MAX}$" from the DCI item number estimation unit 16.

If "$N_{UL\_DCI\_EST}$" falls below "$N_{UL\_DCI\_MAX}$" (YES in step A1), the downlink scheduling unit 14 uses the following mathematical expression to calculate the number of DCI items "$N_{DL\_DCI}$" usable for downlink scheduling (step A2).

$$N_{DL\_DCI} = N_{DCI\_MAX} - N_{UL\_DCI\_EST}$$

If "$N_{UL\_DCI\_EST}$" is equal to or greater than "$N_{UL\_DCI\_MAX}$" (NO in step A1), the downlink scheduling unit 14 sets the number of DCI items "$N_{DL\_DCI}$" usable for downlink scheduling to "$N_{DL\_DCI\_MAX}$" (step A3). The downlink scheduling unit 14 acquires "$N_{UL\_DCI\_MAX}$" from the DCI item number estimation unit 16.

After step A2 or A3, the downlink scheduling unit 14 executes scheduling so that the number of DCI items usable for the downlink is equal to or less than "$N_{DL\_DCI}$" obtained in step A2 or A3 (step A4). Subsequently, the downlink scheduling unit 14 ends the present process. Assuming that the number of DCI items allocated by the downlink scheduling unit 14 is "$N_{DL\_DCI\_RESULT}$," the following relationship can be established.

$$N_{DL\_DCI\_RESULT} \leq N_{DL\_DCI}$$

(Uplink Scheduling Process)

Next, a flow process of the uplink scheduling unit (see 13 in FIG. 1) will be described.

In FIG. 3, first, the uplink scheduling unit 13 determines whether or not the uplink scheduling unit 13 has received downlink scheduling information from the downlink scheduling unit 14 (step B1).

If the uplink scheduling unit 13 has received downlink scheduling information (YES in step B1), the uplink scheduling unit 13 uses the following mathematical expression to calculate the number of DCI items "$N_{UL\_DCI}$" usable for uplink scheduling (step B2). The uplink scheduling unit 13 acquires "$N_{DCI\_MAX}$" from the DCI item number estimation unit 16 and "$N_{DL\_DCI\_RESULT}$" from the downlink scheduling unit 14.

$$N_{UL\_DCI} = N_{DCI\_MAX} - N_{DL\_DCI\_RESULT}$$

If the uplink scheduling unit 13 has not received downlink scheduling information (NO in step B1), the uplink scheduling unit 13 sets the number of DCI items "$N_{UL\_DCI}$" usable for uplink scheduling to "$N_{UL\_DCI\_MAX}$" (step B3). The uplink scheduling unit 13 acquires "$N_{UL\_DCI\_MAX}$" from the DCI item number estimation unit 16.

After step B2 or B3, the uplink scheduling unit 13 executes scheduling so that the number of DCI items usable for the uplink is equal to or less than $N_{UL\_DCI}$ obtained in step B2 or B3 (step B4). Subsequently, the uplink scheduling unit 13 ends the present process. Assuming that the number of DCI items allocated by the uplink scheduling unit 13 is "$N_{UL\_DCI\_RESULT}$," the following relationship can be established.

$$N_{UL\_DCI\_RESULT} \leq N_{UL\_DCI}$$

Timings of the above DCI item use number estimation process, the downlink scheduling process, and the uplink scheduling process will be described below. Hereinafter, processing timings of subframes #n (n=0 to 2) will be described.

In FIG. 4, first, the DCI item number estimation unit 16 executes the DCI item use number estimation process to estimate the number of DCI items usable for an uplink and for a downlink in subframe #0.

Next, by using the estimated number of DCI items usable for the uplink, the downlink scheduling unit 14 executes the downlink scheduling process.

Finally, by using results of the downlink scheduling process or an estimated number of DCI items usable for the downlink, the uplink scheduling unit 13 executes uplink scheduling. After the uplink scheduling unit 13 completes the uplink scheduling process, the PDCCH generation unit 15 generates a PDCCH including DCI, based on scheduling information from the uplink scheduling unit 13 and the downlink scheduling unit 14. The generated PDCCH is mapped in a subframe in a frame, and the base station notifies each mobile station of the PDCCH. In addition, after the uplink scheduling unit 13 completes the uplink scheduling process, the base station executes the DCI item use number estimation process, the downlink scheduling process, and the uplink scheduling process for the next subframe.

In the above description, the downlink scheduling process is executed prior to the uplink scheduling process. However, the uplink scheduling process may be executed prior to the downlink scheduling process. If the uplink scheduling process is executed prior to the downlink scheduling process, the uplink scheduling unit 13 uses an estimated number of DCI items usable for a downlink to execute uplink scheduling in the uplink scheduling process, and the downlink scheduling unit 14 uses results of the uplink scheduling process or an estimated number of DCI items usable for an uplink to execute uplink scheduling in the downlink scheduling process.

According to example 1, in an LTE system, scheduling is executed by using an estimated number of DCI items usable for an uplink and for a downlink. In this way, when scheduling for an uplink and scheduling for a downlink are executed independently at different timings, allocation of DCI based on scheduling information can be executed efficiently.

While basic configurations and operations of example 1 have thus been described, the method for estimating uplink and downlink scheduling information can be modified. DCI, information elements included in scheduling information, is formed by a plurality of constituent elements called control channel elements (CCEs). The number of CCEs forming DCI is changeable depending on a scheduling apparatus and is determined by an algorithm of a scheduling apparatus. Thus, example 1 can be implemented by using the number of CCEs used, instead of the number of DCI items used.

Modifications and adjustments of the exemplary embodiments and examples are possible within the ambit of the overall disclosure (including claims) of the present invention and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

What is claimed is:

1. A base station that executes scheduling for an uplink and scheduling for a downlink per subframe to communicate with mobile stations, the base station comprising:
   a control information item number estimator configured to estimate the number of control information items usable for the uplink and the number of control information items usable for the downlink per subframe;
   a scheduler configured to execute scheduling for the uplink and scheduling for the downlink per subframe by using a number of control information items usable for the uplink and a number of control information items usable for the downlink, the numbers estimated by the control information item number estimator;
   a mobile station information manager configured to manage information about uplink data and downlink data for each of the mobile stations; and
   a common control information manager configured to manage common control information,
   wherein the control information item number estimator is further configured to estimate the number of control information items usable for the uplink and the number of control information items usable for the downlink per subframe by using information from the mobile station information manager and common control information from the common control information manager;
   wherein the scheduler comprises:
   an uplink scheduler configured to execute scheduling for the uplink per subframe by using the number of control information items usable for the uplink estimated by the control information item number estimator and information about uplink data managed by the mobile station information manager; and
   a downlink scheduler configured to execute scheduling for the downlink per subframe by using the number of control information items usable for the downlink estimated by the control information number estimator and information about downlink data managed by the mobile station information manager, and
   wherein, after receiving scheduling information representing results of scheduling for the downlink from the downlink scheduler, the uplink scheduler executes scheduling for the uplink, and
   wherein the control information item number estimator is further configured to estimate the number of control information items usable for the uplink based at least on a count of mobile stations, and
   wherein the estimated number of control information items usable for the uplink is proportional to the count of mobile stations.

2. The base station according to claim 1;
   wherein the control information is DCI; and
   wherein the base station further comprises a PDCCH generator configured to generate a downlink PDCCH including DCI, based on scheduling information representing results of scheduling from the scheduler.

3. The base station according to claim 1;
   wherein the control information is CCE; and
   wherein the base station further comprises a PDCCH generator configured to generate downlink PDCCH including CCE, based on scheduling information representing results of scheduling from the scheduler.

4. A communication system, comprising:
   the base station according to claim 1; and
   a mobile station that can communicate with the base station.

5. The communication system according to claim 4;
   wherein the communication system is an LTE system adopting LTE.

6. A base station that executes scheduling for an uplink and scheduling for a downlink per subframe to communicate with mobile stations, the base station comprising:
   a control information item number estimator configured to estimate the number of control information items usable for the uplink and the number of control information items usable for the downlink per subframe;
   a scheduler configured to execute scheduling for the uplink and scheduling for the downlink per subframe by using a number of control information items usable for the uplink and a number of control information items usable for the downlink, the numbers estimated by the control information item number estimator;
   a mobile station information manager configured to manage information about uplink data and downlink data for each of the mobile stations; and
   a common control information manager configured to manage common control information,
   wherein the control information item number estimator is further configured to estimate the number of control information items usable for the uplink and the number of control information items usable for the downlink per subframe by using information from the mobile station information manager and common control information from the common control information manager;

wherein the scheduler comprises:

an uplink scheduler configured to execute scheduling for the uplink per subframe by using the number of control information items usable for the uplink estimated by the control information item number estimator and information about uplink data managed by the mobile station information manager; and a downlink scheduler configured to execute scheduling for the downlink per subframe by using the number of control information items usable for the downlink estimated by the control information number estimator and information about downlink data managed by the mobile station information manager, and wherein, after receiving scheduling information representing results of scheduling for the uplink from the uplink scheduler, the downlink scheduler executes scheduling for the downlink, and wherein the control information item number estimator is further configured to estimate the number of control information items usable for the uplink based at least on a count of mobile stations, and wherein the estimated number of control information items usable for the uplink is proportional to the count of mobile stations.

7. A base station that executes scheduling for an uplink and scheduling for a downlink per subframe to communicate with mobile stations, the base station comprising:

a control information item number estimator configured to estimate the number of control information items usable for the uplink and the number of control information items usable for the downlink per subframe;

a scheduler configured to execute scheduling for the uplink and scheduling for the downlink per subframe by using a number of control information items usable for the uplink and a number of control information items usable for the downlink, the numbers estimated by the control information item number estimator;

a mobile station information manager configured to manage information about uplink data and downlink data for each of the mobile stations; and a common control information manager configured to manage common control information, wherein the control information item number estimator is further configured to estimate the number of control information items usable for the uplink and the number of control information items usable for the downlink per subframe by using information from the mobile station information manager and common control information from the common control information manager;

wherein the scheduler comprises:

an uplink scheduler configured to execute scheduling for the uplink per subframe by using the number of control information items usable for the uplink estimated by the control information item number estimator and information about uplink data managed by the mobile station information manager; and a downlink scheduler configured to execute scheduling for the downlink per subframe by using the number of control information items usable for the downlink estimated by the control information number estimator and information about downlink data managed by the mobile station information manager, wherein, after receiving scheduling information representing results of scheduling for the downlink from the downlink scheduler, the uplink scheduler executes scheduling for the uplink, and wherein, when the uplink scheduler and the downlink scheduler complete respective scheduling processes in a previous subframe, the mobile station information manager updates information about uplink data and downlink data in a next subframe.

8. A communication control method executed in a base station executing scheduling for an uplink and scheduling for a downlink per subframe to communicate with mobile stations, the method comprising:

estimating a number of control information items usable for the uplink and a number of control information items usable for the downlink per subframe;

using the estimated number of control information items usable for the uplink and the estimated number of control information items usable for the downlink to execute scheduling for the uplink and scheduling for the downlink per subframe;

wherein, in said estimating the numbers, the number of control information items usable for the uplink and the number of control information items usable for the downlink per subframe are estimated by using information about uplink data and downlink data for each of the mobile stations and common control information;

wherein, in said executing scheduling, scheduling for the uplink is executed per subframe by using the estimated number of control information items usable for the uplink and the information about uplink data; and wherein, in said executing scheduling, scheduling for the downlink is executed per subframe by using the estimated number of control information items usable for the downlink and the information about downlink data; and wherein, in said executing scheduling, after scheduling information representing results of scheduling for the downlink is received, scheduling for the uplink is executed, and wherein the estimating the number of control information items usable for the uplink is based at least on a count of mobile stations, and wherein the estimated number of control information items usable for the uplink is proportional to the count of mobile stations.

9. The communication control method according to claim 8;

wherein the control information is DCI; and wherein the method comprises a step of generating a downlink PDCCH including DCI based on scheduling information representing results of the scheduling.

10. The communication control method according to claim 8;

wherein the control information is CCE; and wherein the method comprises a step of generating a downlink PDCCH including CCE based on scheduling information representing results of the scheduling.

11. A communication control method executed in a base station executing scheduling for an uplink and scheduling for a downlink per subframe to communicate with mobile stations, the method comprising:

estimating a number of control information items usable for the uplink and a number of control information items usable for the downlink per subframe;

using the estimated number of control information items usable for the uplink and the estimated number of control information items usable for the downlink to execute scheduling for the uplink and scheduling for the downlink per subframe;

wherein, in said estimating the numbers, the number of control information items usable for the uplink and the number of control information items usable for the downlink per subframe are estimated by using information about uplink data and downlink data for each of the mobile stations and common control information;

wherein, in said executing scheduling, scheduling for the uplink is executed per subframe by using the estimated number of control information items usable for the uplink and the information about uplink data; and wherein, in said executing scheduling, scheduling for the downlink is executed per subframe by using the estimated number of control information items usable for the downlink and the information about downlink data; and wherein, in said executing scheduling, after scheduling information representing results of scheduling for the uplink is received, scheduling for the downlink is executed, and wherein the estimating the number of control information items usable for the uplink is based at least on a count of mobile stations, and wherein the estimated number of control information items usable for the uplink is proportional to the count of mobile stations.

12. A communication control method executed in a base station executing scheduling for an uplink and scheduling for a downlink per subframe to communicate with mobile stations, the method comprising:

estimating a number of control information items usable for the uplink and a number of control information items usable for the downlink per subframe;

using the estimated number of control information items usable for the uplink and the estimated number of control information items usable for the downlink to execute scheduling for the uplink and scheduling for the downlink per subframe;

wherein, in said estimating the numbers, the number of control information items usable for the uplink and the number of control information items usable for the downlink per subframe are estimated by using information about uplink data and downlink data for each of the mobile stations and common control information;

wherein, in said executing scheduling, scheduling for the uplink is executed per subframe by using the estimated number of control information items usable for the uplink and the information about uplink data; and wherein, in said executing scheduling, scheduling for the downlink is executed per subframe by using the estimated number of control information items usable for the downlink and the information about downlink data; and wherein, in said executing scheduling, after scheduling information representing results of scheduling for the downlink is received, scheduling for the uplink is executed, and the method further comprising a step of updating information about uplink data and downlink data in a next subframe when a scheduling process for the uplink and a scheduling process for the downlink in a previous subframe are completed.

13. A non-transitory computer readable recording medium storing a program, said program causing a base station to execute the communication control method according to claim 8.

14. A non-transitory computer readable recording medium storing a program, said program causing a base station to execute the communication control method according to claim 11.

\* \* \* \* \*